Sept. 19, 1950          R. R. RIESZ          2,522,539
FREQUENCY CONTROL FOR SYNTHESIZING SYSTEMS
Filed July 2, 1948          2 Sheets-Sheet 1
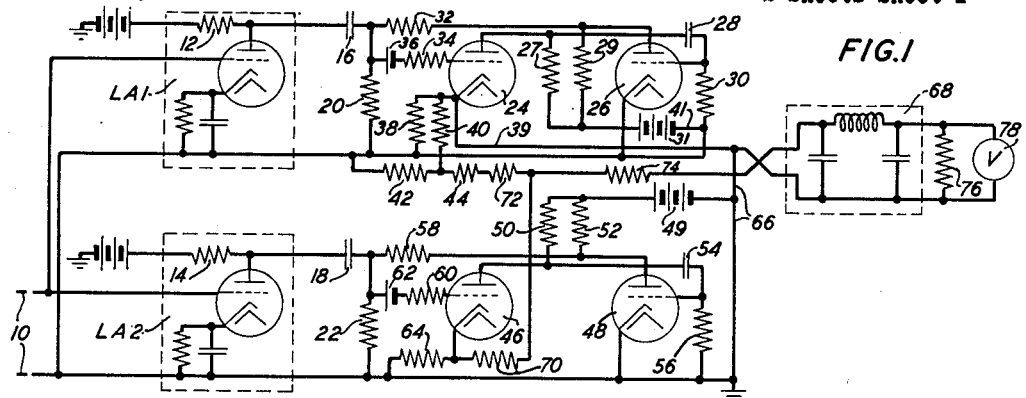
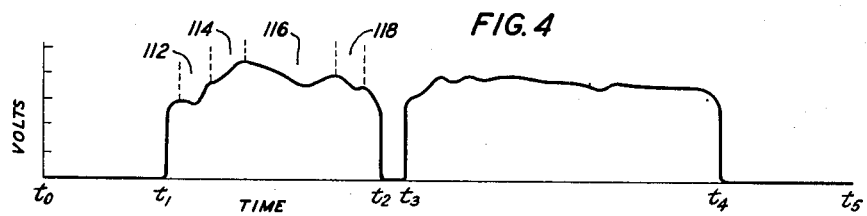
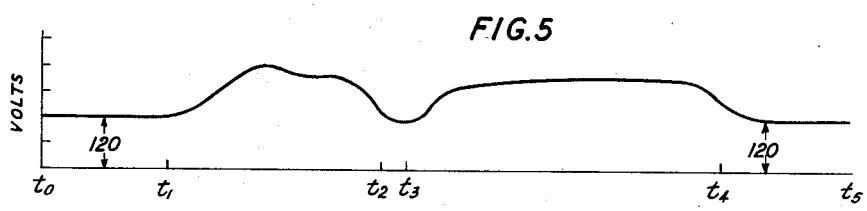
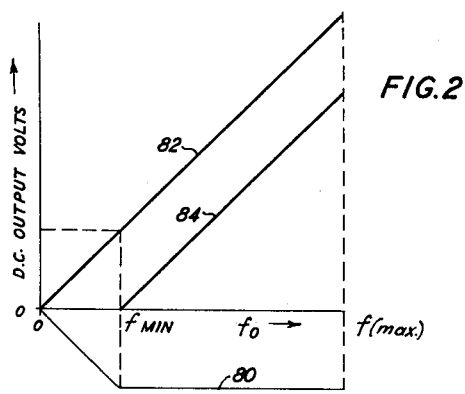
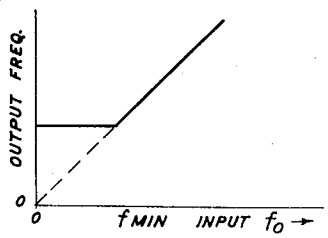
INVENTOR
R. R. RIESZ
BY H. A. Burgess
ATTORNEY

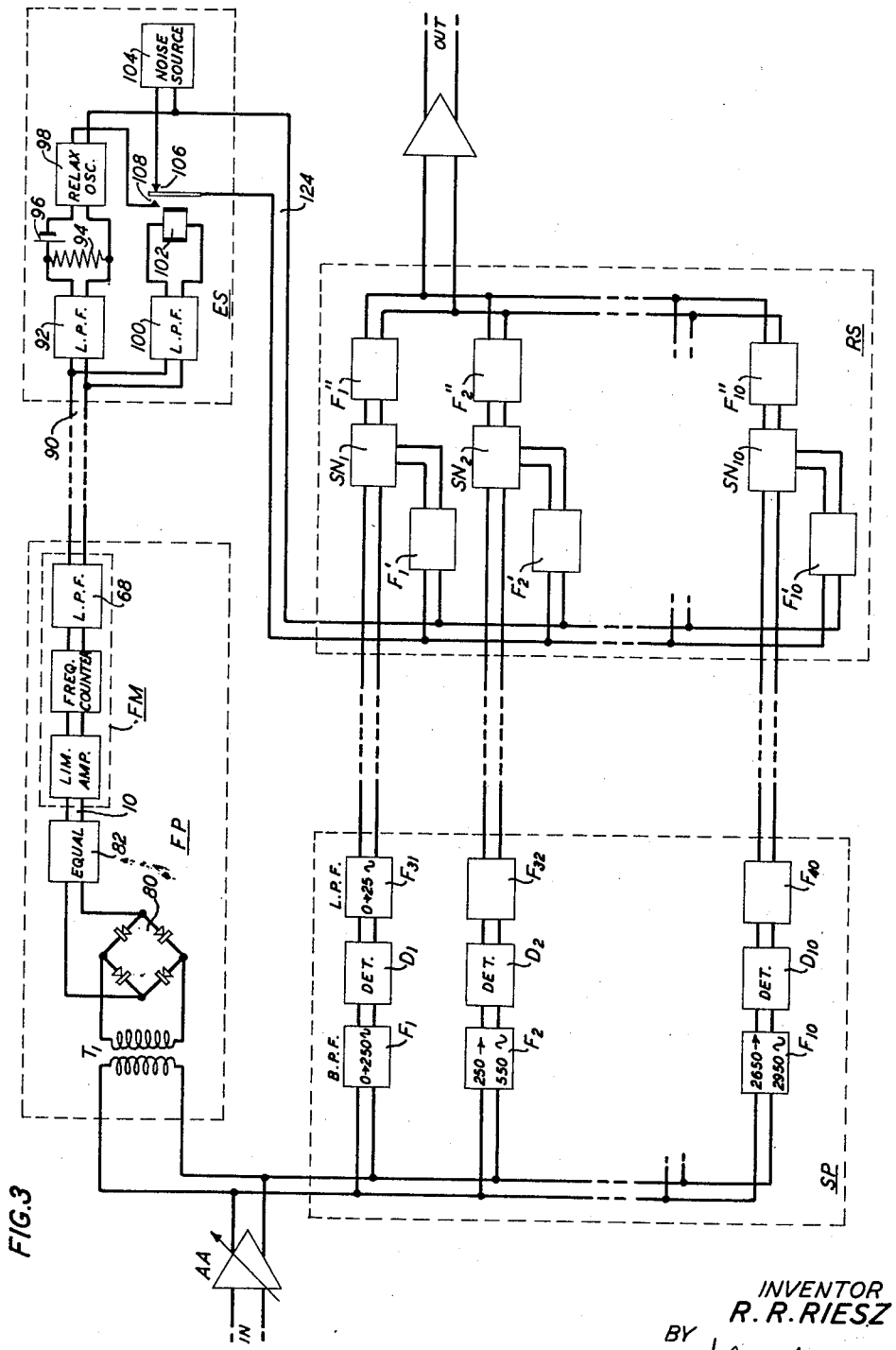

Patented Sept. 19, 1950

2,522,539

UNITED STATES PATENT OFFICE 2,522,539

FREQUENCY CONTROL FOR SYNTHESIZING SYSTEMS

Robert R. Riesz, Chatham, N. J., assignor to Bell Telephone Laboratories, Incorporated, New York, N. Y., a corporation of New York Application July 2, 1948, Serial No. 36,599

11 Claims. (Cl. 179—1)

This invention relates to signaling systems, and more particularly to a frequency measuring and control arrangement for use with signal analyzing and synthesizing systems.

An object of the invention is to improve the method for determining the frequency of the fundamental component of a complex signal wave.

A second object of the invention is to improve the method for analyzing and reconstructing speech signal waves.

Signal analyzing and synthesizing, or "vocoder", systems of the general type wherein the intelligence content of the speech signal wave is extracted in the form of a number of slowly varying unidirectional currents, or voltages, which are then used to control the operation of synthesizing apparatus in reconstructing the original signal wave have been described and claimed in my United States Patent No. 2,183,248, issued December 12, 1939 and in H. W. Dudley Patents No. 2,151,091, issued March 21, 1939 and No. 2,243,527, issued May 27, 1941. As is there explained in complete detail, systems of this general type may be utilized for the analysis and synthesis of speech or other vocal signals; for frequency range reduction and restoration; or for other purposes such as privacy of the transmitted message. In each of these systems, the signal wave is analyzed to determine its "voiced" or "unvoiced" character. If the signal is of the so-called voiced type, it is further analyzed to determine its fundamental frequency, and this determination is converted into a readily usable control force.

The pitch, or fundamental frequency, of the signals may be determined by direct extraction of the fundamental component through the use of selective networks, if this component is present in the analyzed wave. If the fundamental component is not present, the higher frequency harmonic wave components may be detected in a suitable non-linear device in such manner that two or more adjacent wave components cooperatively react to produce a product which may be called the difference product component. In theory, this difference frequency component is numerically equal in frequency to the actual fundamental frequency component of the signal wave. In actual practice, however, the frequency of this difference frequency product may vary by a considerable amount, in some cases as much as ten per cent, from the true fundamental frequency of the signal wave. This situation arises because of the physical factors surrounding the production of speech signals.

It is well known that speech signals of the voiced type are produced by the combined effects of vibrations of the vocal cords and the modulatory influences of the resonant cavities of the vocal tract. The frequency of vibration of the vocal cords is the true fundamental frequency of the speech signal. If the frequency of vibration of the vocal cords is maintained constant, and the physical shape of the resonant cavities of the vocal tract is also maintained constant, such as during the sustained singing of a musical note, the amplitudes of the harmonic components for any given fundamental frequency will remain substantially constant. Under these circumstances, the frequency of the $n$th harmonic at the mouth opening is the same as it was at the beginning of the vocal tract. If, however, the configuration of the resonant cavities of the vocal tract is changing with time, such as during the production of a sequence of speech sounds, the resultant changes in the phase shift along the vocal tract give rise to an apparent frequency of the harmonic component which is somewhat different from its true or original frequency. Therefore, where the pitch determination is made by combining a number of adjacently located harmonic wave components in a detecting arrangement for deriving an output product which is the difference frequency between adjacent ones of the changing harmonic wave components, an apparent frequency will be indicated which may, and probably will be different than the true frequency of the fundamental. Furthermore, the effect of these modulatory changes in the vocal tract are not the same for all complex waves, and it is not possible to compensate for these changes by a fixed or proportional correction factor. Some complex waves are so composed that they comprise two strong adjacent harmonic components that effectively produce the difference frequency product in a detection arrangement. Other waves are composed such that three or more strong adjacent harmonic components are present and cooperate to produce this difference frequency product. If the detected product is derived from the interaction of three adjacent wave components, its frequency is influenced by the rate of change of amplitude and also by the rate of change of phase between the interacting components. If it is derived from only two adjacent prominent wave components, its frequency is influenced only by the rate of change of phase of these components, provided each component is maintained above some predetermined minimum amplitude level. This situation effectively precludes the introduction of a fixed or varying compensating factor to offset the effect of the modulatory changes in the vocal tract.

In the production of a sequence of speech signals, the fundamental frequency of the wave, and hence the amplitude and frequency of its harmonic wave components, changes at relatively slow syllabic rates which usually do not exceed about 8 cycles per second. Conversely, the modulatory changes, introduced by the resonant cavities of the vocal tract, may occur with considerable speed, such that the rate of change of phase is relatively much faster than the amplitude changes, and under extreme circumstances may be of the order of thousands of cycles per second. Therefore, where changing harmonic wave components are combined in a detection process, the frequency of the ensuing difference product momentarily varies from the true frequency of the fundamental component. If the frequency of this difference product is then represented by a unidirectional voltage, it will be noted that two components are present. The principal voltage component varies in amplitude at a syllabic rate corresponding to the true fundamental frequency. Superposed on this main component is a second varying component of considerably higher frequency, which is caused by these phase changes in the speech signal. Under such circumstances, the use of this unidirectional voltage to control the operation of the signal synthesizing apparatus may give rise to a synthesized signal the frequency of which occasionally and rapidly varies above and below the true value of the original fundamental component of the signal. When this happens the synthesized signal often possesses a harsh, or raucous, quality. It is accordingly an object of this invention to permit the reconstruction, or synthesizing, of the original signal wave in substantial accordance with its true fundamental frequency, and without this harsh or raucous quality contributed by the effects of the modulatory changes in the vocal tract.

In accordance with the invention, these objects are attained by simple and economical circuit means by which the apparent frequency of the fundamental component of the signal wave is indicated in terms of a unidirectional voltage, the amplitude of which varies in linear relation as the frequency of the fundamental component exceeds a predetermined minimum value. The range of frequencies over which this linear relationship prevails may be made greater or smaller in accordance with individual circumstances. At the receiving station the derived unidirectional voltage is segregated into two portions, one of which controls the switching operations whereby the synthesized signal is changed from voiced to unvoiced characteristics, or vice versa; and the second portion of which is used to control the frequency of the fundamental component of the synthesized voiced signal in such a manner that the synthesized signal reflects substantially the true frequency of the original signal, and not the apparent frequency such as exists after the signal has traversed the modulatory path of the vocal tract.

The manner in which the invention accomplishes the above-described objects may be best understood from a detailed description of one embodiment of the invention, when considered in conjunction with the drawing, in which:

Fig. 1 is a schematic circuit diagram of the frequency measuring apparatus employed at the analyzing station;

Figs. 2, 4, 5 and 6 are explanatory graphs to which references are made in the detailed description; and Fig. 3 is a functional schematic diagram of a signal analyzing and synthesizing communication system in accordance with the invention.

In the circuit of Fig. 1, an alternating voltage wave, such as a speech signal wave, the frequency of the fundamental component of which is to be determined, received from connecting input circuit 10 is impressed upon the limiting amplifiers LA1 and LA2. These amplifiers may be of any well-known design, using one or more electron discharge devices, for providing a desired amount of amplification determined by the circuit constants and for effectively removing amplitude variations from the applied signal by limiting the maximum positive and negative voltage peaks of the signal to desired values. The voltage waves produced across anode resistors 12, 14 are of commonly-termed square, or rectangular wave form.

The square-topped wave from upper limiting amplifier LA1 is transmitted through a circuit which comprises capacitor 16 in series with resistor 20. In similar manner the square-topped wave from limiting amplifier LA2 is transmitted through a series circuit comprising capacitor 18 and resistor 22. The values of capacitors 16, 18 and resistors 20, 22 are chosen to provide very small time constants, and each combination of a capacitor and resistor as indicated constitutes a differentiating, or peaking, circuit which produces short voltage surges, or peaks, across the resistor component at the beginning and end of each square-topped wave obtained from the associated limiting amplifier. These peaked voltage surges are used to actuate the frequency counting and indicating branch of the frequency measuring circuit.

The frequency counting and indicating function is concurrently performed in the upper and lower branch circuits of the frequency measuring arrangement, each of which includes a single-trip multivibrator oscillator. The upper branch of the circuit includes the multivibrator oscillator comprising two three-electrode elements 24, 26, which may be two triode vacuum tube elements in a single envelope, if desired. The anode, or plate, of each triode element 24, 26 is connected through equal plate resistors 27, 29 to the positive terminal of a source of anode potential, or battery 31. The anode of tube 24 is connected to the control grid-electrode of tube 26 through coupling capacitor 28. Resistor 30 is connected between this control grid-electrode and the associated cathode, which is also connected to the negative terminal of potential source, or battery 31. The anode of tube 26 is connected to the control grid-electrode of tube 24 through resistors 32, 34 and grid biasing source, or battery 36. The junction of resistor 32 and battery 36 is connected to the peaking, or differentiating, circuit at a point between capacitor 16 and resistor 20. The cathode of tube 24 is connected to the negative terminal of potential source 31 through cathode resistor 38 and also through resistors 40, 42, which together with resistor 44 forms an attenuating network. Resistor 44 is connected to a low-pass filter 68 through two resistors 70, 74 of the three-resistor hybrid connection comprising resistors 70, 72 and 74. For purposes which will be later explained, the attenuating network forms a voltage dividing and impedance matching circuit. The resistance hybrid circuit comprising resistors 70, 72 and 74 provides means for coupling the output of the upper and lower branch circuits to the smoothing filter 68, and also acts as an impedance improving element between the upper and lower voltage generators and filter 68. The cathode end of resistor 38 is connected to the lower terminal of filter 68 over connecting path 39, and is also connected to a common ground potential over interconnecting circuit 66.

The lower branch of the circuit includes the single-trip multivibrator oscillator comprising the triode elements 46, 48, which may also consist of two triode vacuum tube elements in a single envelope if desired. The anodes or plates of tubes 46, 48 are connected through equal plate resistors 50, 52 to the positive terminal of a second individual source of plate potential, or battery 49. The anode of tube 46 is coupled to the control grid-electrode of tube 48 through coupling capacitor 54. Resistor 56 is included in the grid-cathode circuits of tube 48. The anode of tube 48 is connected to the control grid-electrode of tube 46 through the path that includes resistors 58, 60 and grid biasing source, or battery 62. The cathode of tube 46 is connected to the negative terminal of battery 49 through cathode resistor 64 and interconnecting circuit 66, which also extends from the negative terminal of battery 49 to the lower terminal of filter 68. The upper end of cathode resistor 64 is connected to the upper terminal of low-pass filter 68 through resistors 70, 74 of the resistance hybrid circuit comprising resistors 70, 72 and 74. Although for the successful practice of this invention the following condition is not essential, for the purposes of this disclosure the values of all of the circuit elements of the lower multivibrator with the exception of capacitor 54 and resistor 56 may be the same as the values of like members in the upper branch circuit with the exception of capacitor 28 and resistor 30. Furthermore, if desirable, resistors 30 and 56 may have the same value, in which case in the following described example the capacitor 28 will have a value about four or five times as large as that of capacitor 54. The actual values of any of the circuit elements of this arrangement may be a matter of personal preference so long as the relationship between circuit elements conforms to well-known design principles covering the design of multivibrator oscillator circuits.

With no signal applied over interconnecting circuit 10, tubes 24 and 46 of the upper and lower frequency counting multivibrators are biased to their cut-off potential by the negative potential derived from sources 36, 62, respectively. The control electrodes of their conjugate tubes 26, 48 are at cathode potential, and these tubes are conducting current at or near their saturation value.

When a low frequency signal wave is received over input circuit 10, it is limited and amplified in the upper and lower limiting amplifiers LA1, LA2 and short sharp positive and negative voltage peaks are produced in each peaking, or differentiating circuit across the resistor elements 20, 22, respectively. The positive voltage peaks, when applied to the control electrodes of tubes 24, 46 are sufficient to overcome the negative biasing potential derived from sources 36, 62 and cause tubes 24, 46 to momentarily become conductive in the usual manner. In the manner well known in the multivibrator art, this action gives rise to a negative voltage change in the anode circuit of the respective tube, which voltage change operates to reduce current conduction in the conjugate tubes 26, 48, and force full conduction in tubes 26, 46 by the accumulative action of pulse amplification around the pulse conducting circuit. In this manner the circuit conduction conditions are reversed; the previously conducting tubes 26, 48 are cut off, and the previously non-conducting tubes 24, 46 are at saturation condition. In the absence of any other controlling factors this current conduction condition will prevail until the potential differences existing across capacitors 28 and 54 have equalized to a point where the respective tubes 26, 48 again regain their conduction potential. However, if a negative voltage peak of sufficient magnitude is received from limiting amplifiers LA1, LA2 before the potential differences across coupling capacitors 28, 54 have equalized, the upper and lower multivibrators will be reversed before these potentials have naturally equalized. After each operating cycle tubes 24, 46 remain in their non-conductive state until the next positive actuating voltage peak is received. From the foregoing, it will be noted that tubes 24 and 46 each conduct for fixed periods during each cycle of operation, until the frequency of the applied actuating wave acquires such a value that its negative voltage peak causes the multivibrator to complete its operating cycle in a time interval which is shorter than the oscillator's natural period as controlled by its circuit values. Depending upon the values of capacitors 28, 54 and resistors 30, 56 there will be a frequency value of the actuating wave such that the period between the positive and negative voltage peaks derived from the differentiating circuit is exactly equal to the cut-off period for tubes 26, 48. Stated otherwise, this period or interval between the positive and negative peaks will be exactly equal to the time interval that is required for the potential difference across coupling capacitor 28 or 54 to equalize such that the associated tube again regains its conductive state. It is therefore apparent that as the frequency of the applied actuating wave is increased, tube 24 or 46 will conduct an increasing number of intervals. When the frequency of the applied wave reaches the previously described critical frequency, at which the interval between voltage peaks is equal to the cut-off period of the normally conducting tube, tube 24 or 46 will conduct for exactly one-half of the time. For all further increases in the frequency of the applied actuating wave this proportionality will remain constant, since the multivibrator will be actuated by the equally spaced positive and negative voltage peaks. It is also apparent that the frequency at which this equal conduction period first appears will be controlled by the values of capacitors 28, 54 and the associated grid resistors 30, 56. Through the choice of suitable values for these components, one of the multivibrators may be caused to reach this equal conduction or saturation state at a lower frequency than the other multivibrator circuit. In the practice of this invention, the values of capacitor 28 and resistor 30 may be so chosen that the upper multivibrator reaches its saturation, or equal conduction state at a frequency which is slightly less than the minimum expected frequency of the signal wave's fundamental component. In similar fashion, values may be chosen for coupling capacitor 54 and its associated grid resistor 56 such that the lower multivibrator reaches this condition of equal conduction periods, or its so-called saturation condition at a frequency slightly in excess of the highest frequency that the fundamental component may be expected to attain.

During the conductive periods of tubes 24, 46, current flowing in the cathode resistors 38, 64 causes voltage pulses to be generated across each resistor element. The voltage generated across cathode resistor 64 will be positive with respect to ground potential, and to the lower terminal of low-pass filter 68. The voltage generated across cathode resistor 38 will be negative with respect to ground potential, since the cathode end of this resistor is maintained at ground potential by its connection over connecting paths 39 and 66. Therefore, if the upper and lower multivibrators were identical such that tubes 24 and 46 conducted for equal intervals during each cycle of operation, the voltage pulses produced across their respective cathode resistors 38, 64 would be equal in magnitude but opposed in polarity. However, in accordance with the invention, these tubes do not conduct for equal periods during each cycle, because the time constants of their associated coupling circuits are unequal. In this described embodiment it may be assumed that the upper multivibrator is arranged to reach its saturation point, or condition of equal conduction periods at a frequency slightly below 80 cycles per second, and the lower multivibrator reaches saturation at about 425 cycles per second. For this reason the average value of the voltage pulses produced across resistor 38 will exceed the average value of the voltage pulses produced across cathode resistor 64 for all values of the frequency of the input wave below the frequency at which the lower multivibrator attains equal conduction periods, or saturation. For this reason, the attenuating network comprising resistors 40, 42 and 44 is bridged across the voltage generating cathode resistor 38, and is proportioned such that in addition to matching the impedance of this cathode generator, it attenuates the voltage pulses generated therein to a value equal to those generated across the cathode resistor 64 in the lower multivibrator. These voltage pulses, produced by the upper and lower units, are combined in the resistor hybrid circuit comprising resistors 70, 72 and 74 before they are transmitted through the 25-cycle low-pass filter 68. Transmission of these combined pulses through the low-pass filter 68 smoothes, or averages them such that there appears across the load resistor 76 an averaged voltage value which increases smoothly and linearly with increases in the frequency of the wave applied over interconnecting circuit 10.

This condition is illustrated in the curves of Fig. 2 in which curve 80 indicates the relative polarity and magnitude of the voltage measured on meter 78 when the voltage pulses from the upper multivibrator circuit alone are averaged in low-pass filter 68. Curve 82 indicates identical information for the voltage generated by the lower multivibrator unit alone. Curve 84 indicates the combined outputs of the upper and lower units after their combination and averaging in low-pass filter 68. From this latter curve it will be noted that the upper and lower multivibrator outputs are equal and opposed in polarity for all frequency values from zero up to value ($f_{min}$). When the frequency of the applied wave reaches value ($f_{min}$), the output from the upper multivibrator reaches its stable or saturation value and continues at this valve for further increases of the applied frequency. The effect of this action is that the combined output, as observed across the load resistor 76, is such that no voltage output is secured from the frequency counting and indicating circuits until the frequency of the applied actuating wave equals or exceeds this value ($f_{min}$), which in the described example is assumed to be slightly less than 80 cycles per second. Further increases in the frequency of the applied wave results in linearly increasing the amplitude of the combined voltages, until at some higher frequency value ($f_{max}$) the lower multivibrator attains its condition of equal conduction periods, and the output voltage no longer increases as the frequency of the applied wave is increased. As was previously stated, the frequency value ($f_{max}$) should be chosen to be higher than the highest expected fundamental frequency of the analyzed signal.

In Fig. 3 there is shown a signal analyzing and synthesizing or "vocoder" system of the general type such as was disclosed and claimed in my United States Patent No. 2,183,248, issued December 12, 1939, or in the H. W. Dudley Patents No. 2,151,091, issued March 21, 1939 and No. 2,243,527, issued May 27, 1941. This system differs from the system described in the above-mentioned patents in that the pitch determining, or frequency pattern control circuit at the transmitting, or analyzing end, and the associated apparatus at the receiving, or synthesizing end of the system are arranged in accordance with this invention. With reference to this figure, the analyzing apparatus is shown at the left, and the synthesizing apparatus at the right. For purposes of simplifying this description, the usual carrier equipment by which the low frequency unidirectional control currents may be suitably transposed in the frequency spectrum for convenient transmission purposes is not included, it being understood that any suitable means may be employed for transmitting the control currents between the analyzing and transmitting apparatus.

The analyzing apparatus includes a variable gain amplifier AA for maintaining the incoming signal wave at a suitable constant volume level. This amplifier may be any suitable device, for example the well-known voice operated gain adjusting device known as a "vogad." Following amplifier AA, the circuit divides into two main portions; the first branch connecting to the pitch deriving, or frequency pattern control branch FP, shown at the upper left of the figure, which cooperates with or is connected to the energy sources and control equipment ES at the receiving or synthesizing apparatus; and the second branch which connects to the individual channels of the spectrum channel equipment SP in the lower left portion of the figure.

The apparatus arrangement, and the operation of the spectrum channels SP is described in my Patent 2,183,248, issued December 12, 1939, as well as in the previously mentioned patents issued to H. W. Dudley, and reference may be made to these for a detailed description of this portion of the circuit arrangement. For the purposes of this disclosure, the following general description is belived to be sufficient. The speech wave from amplifier AA is divided into a suitable number of contiguous frequency subbands, for example, 10 as indicated by the band-pass filters $F_1 \ldots F_{10}$ in the input circuits of the individual channels. These frequency subbands are amplified and detected, or rectified, in the amplifier-detectors $D_1 \ldots D_{10}$; and the resultant direct-current component in each channel is selected by the respective low-pass filters $F_{31} \ldots F_{40}$. Each of these filters passes a frequency band extending from zero to 25 cycles per second, which experience has indicated is sufficient to permit suitable control of the synthesizing apparatus in determining the frequency-amplitude characteristic of the synthesized signal. Frequency components in excess of 25 cycles per second are suppressed in these filters $F_{31} \ldots F_{40}$, and their outputs form a series of unidirectional currents or voltages, each of which varies in amplitude as the energy content of its associated subfrequency band is varied. The value of a current, or voltage, at any instant is a function of the energy content of that particular signal subband associated with the channel in which the filter is included. The outputs of these low-pass filters $F_{31} \ldots F_{40}$ are transmitted to the synthesizing end of the system by any suitable means, where they are applied to one input of the respective modulator, or shaping network $SN_1 \ldots SN_{10}$ in the receiving spectrum channel RS. The so-called "hiss" and "buzz" synthesizing energy is obtained from noise source 104 and relaxation oscillator 98, respectively, and is applied through the respective band-pass filters $F'_1 \ldots F'_{10}$ to the second input of the shaping network $SN_1 \ldots SN_{10}$ where the slowly varying spectrum currents or voltages control the magnitude of the separate frequency subbands which collectively form the synthesized signal.

The pitch deriving, or frequency pattern control channel FP of the system is indicated in the upper portion of Fig. 3 and is arranged for determining the frequency of the fundamental components by the previously described detection process. If the fundamental component were actually present in the analyzed wave it would be possible to segregate it by selective networks, and the indicated arrangement might be changed to permit this selection by substituting a suitable band filter in place of detector 80. The channel includes an input transformer $T_1$, and a detecting device 80 which may comprise the well-known copper oxide or other suitable rectifying devices arranged in a conventional bridged connection; an equalizer 82 follows detecting device 80 and has its transmission frequency characteristic arranged such that the attenuation through it increases as the frequency is increased such that the relatively low frequency fundamental component emerges from the equalizer at a considerably higher level than any other harmonically located wave component; and the frequency measuring circuit FM including in this order, a pair of limiting amplifiers LA1 and LA2, a frequency counter and a low-pass filter 68 such as were described in the frequency measuring arrangement of Fig. 1. A function of this circuit is to convert the fundamental pitch frequency as obtained from equalizer 82 into a slowly varying direct current, or voltage, the magnitude of which is zero until the pitch frequency of the signal equals some predetermined value ($f_{min}$) and which linearly increases as the frequency of the fundamental frequency component is increased above this value until a maximum frequency value ($f_{max}$) is attained. The characteristics of this circuit have been previously described in connection with Fig. 1 and its output voltage is indicated by curve 84 of Fig. 2. In this described example it may be assumed that the fundamental frequency will vary from a low of about 80 cycles per second to a high of about 400 cycles per second. Under these circumstances the corresponding suitable values for ($f_{min}$) and ($f_{max}$) would be slightly less than 80 cycles and slightly more than 400 cycles per second respectively. Accordingly, the circuit components of the upper and lower multivibrators of the frequency counter may be suitably selected such that the lowest frequency at which tubes 24, 26 (Fig. 1) of the upper multivibrator will conduct for equal intervals is slightly less than 80 cycles per second, and the lowest frequency at which the tubes 46, 48 of the lower unit will conduct for equal intervals will be slightly in excess of 400 cycles per second. Low-pass filter 68 may be a 25-cycle filter that will pass a frequency band extending from zero to 25 cycles per second. The output of low-pass filter 68 may be connected to a transmission line, or other suitable transmission medium, instead of being terminated by the characteristic resistance 76 and the measuring voltmeter 78 as indicated in Fig. 1.

The derived pitch signal, the amplitude of which varies with frequency in accordance with the manner indicated by curve 84 of Fig. 2, or as it may be modified for transmission purposes, is transmitted to the synthesizing end of the system where it controls the operation of the energy sources 98, 104 and the switching relay 102. This apparatus is divided into two branches; the upper of which comprises low-pass filter 92 having a pass band extending from zero to about 10 cycles per second; load resistor 94; bias source, or battery 96 and a conventional relaxation oscillator 98 such as has been described in the previously referred to patents. This oscillator 98 constitutes the so-called "buzz" source of voiced energy for the synthesizing operation. The lower circuit branch comprises low-pass filter 100 which may be a 25-cycle filter similar to filter 68 and those contained in the analyzing and synthesizing spectrum control branches; normally non-operated relay 102 which possesses two sets of contacts 106, 108; and noise source 104 which may be a thermal noise generator such as has been previously described in the above-mentioned patents and which constitutes the source of so-called "hiss" or unvoiced energy.

As received, the varying amplitude pitch indicating signal may have the general form indicated by the somewhat idealized curve of Fig. 4. This curve indicates the general form of the pitch indicating signal as it is derived by the frequency measuring circuit FM from the spoken words "shoe bench." The interval $t_0 t_1$ indicates the output from the unvoiced fricative consonant "sh." Interval $t_1 t_2$ indicates the output for the long vowel sound (ū) representing the "oe" portion of "shoe." Interval $t_2 t_3$ indicates the interval between words; interval $t_3 t_4$ indicates the voiced stop consonant "b," the vowel "e" and the semi-vowel "n." Interval $t_4 t_5$ indicates that portion of the signal that is due to the unvoiced stop consonant "ch." The abrupt changes in amplitude at times $t_1$, $t_2$, $t_3$ and $t_4$ correspond to the beginning and end of the voiced intervals. Unwanted amplitude variations are indicated by the unsteady or wavering portions of the Fig. 4 curve at intervals 112, 114, 116 and 118. At intervals 112 and 114 there are shown superposed components in which the amplitude changes occur at a rate of about 40 cycles per second; interval 116 indicates a superposed frequency of about 14 cycles per second and interval 118 indicates one of about 50 cycles per second. These unsteady, or wavering amplitudes denote rapid frequency changes, and may arise from the detection of adjacent harmonic wave components when their amplitudes and, or, their phase relations are changing. The derived pitch control signal is indicative of the apparent rather than the true frequency of the fundamental component of the signal wave, and where this signal is used to control the fundamental frequency of a synthesized signal it will occasionally impart a harsh, or raucous quality to that signal. This harshness arises because the frequency of the reconstructed signal is not uniformly and gradually changed from one to another value at the relatively low syllabic rate, but rather wavers above and below the true fundamental frequency at a rate which depends upon the frequency of the superposed component. The extent of each of these frequency excursions is determined by the amplitude of the superposed component.

In the past, it has been customary to use all of the amplitude variations of the derived pitch control signal to control the operation of the relaxation oscillator which constitutes the source of voiced energy. During unvoiced intervals corresponding to intervals $t_0 t_1$ and $t_2 t_3$ (Fig. 4), the oscillator was deenergized or turned off. During voiced intervals, corresponding to times $t_1$ and $t_3$, the oscillator was turned on, or energized, and its frequency was adjusted to the proper value by the amplitude of the pitch control signal. In order that changes in the frequency of the relaxation oscillator might be made in a time interval comparable to the time required for frequency changes in the original signal, it was necessary that the band-width of the transmission path be wide enough to permit the control voltage to rise and decay with a minimum of delay. This band-width was also wide enough to permit the unwanted, relatively high frequency superposed components to pass and exert their control influence in producing the unwanted harsh qualities.

In accordance with this invention this undesirable behavior of the synthesized signal is substantially eliminated by dividing the transmitted pitch control signal into two portions in accordance with their intended work functions. One portion is used to control the choice between the unvoiced and voiced energy sources 98, 104. The second portion is treated to remove the unwanted relatively high frequency amplitude variations before this portion is used to control the frequency of the fundamental component of the synthesized signal. The manner in which these two signal portions are utilized may become more apparent from the following description.

At point 90 the received pitch signal is divided between the upper and lower branch circuits. The entire amplitude range of the pitch signal is passed by 25-cycle filter 100 and operates the normally non-operated relay 102 during intervals $t_1 t_2$ and $t_3 t_4$. Operation of this relay opens contact 106 and closes contact 108 so that the spectrum channel equipment RS is disconnected from noise source 104 and is connected to relaxation oscillator 98. In the upper branch circuit a steady biasing potential from source 96 causes relaxation oscillator 98 to oscillate at its minimum frequency of about 80 cycles per second during the intervals when no signal voltage is being received from low-pass filter 92. These intervals correspond to the unvoiced intervals of the original speech signal. Since relay 102 is non-operated during these intervals, the relaxation oscillator 98 is disconnected from the spectrum channel circuits and plays no part in the synthesizing process. This is a variation from the previously known operating procedure in which the relaxation oscillator was turned off at times corresponding to the no-voltage intervals. As the incoming pitch defining voltage signal wave traverses the 10-cycle filter 92, substantially all of the higher frequency components indicated at intervals 112, etc. (Fig. 4) are removed. Similarly the abrupt amplitude changes that occurred at times $t_1$, $t_2$, $t_3$, and $t_4$ are smoothed such that the rate of change of amplitude at these times is considerably lessened. This smoothed, or filtered, voltage wave appears across load resistor 94 and is added to the potential of biasing source 96 to control the frequency of oscillation of relaxation oscillator 98 and cause this oscillator to faithfully reproduce the frequency of the fundamental component of the signal wave. The effect of combining the smoothed pitch determining signal and the potential source 96 is indicated in the curve of Fig. 5, which indicates the voltage-time distribution of the pitch control signal as measured at the control electrode of oscillator 98. From this curve it will be noted that there is a steady state voltage amplitude 120, which is contributed by biasing sources 96; there is also superposed on this steady potential a varying amplitude potential derived from the filtered transmitted signal as it is developed across terminating load resistor 94. This new pitch control signal, when applied to the control electrode of oscillator 98, is sufficient to maintain that unit at a frequency slightly less than 80 cycles per second during the unvoiced periods of the speech signals, and to uniformly control the frequency of its oscillations at the desired values during the voiced period $t_1 t_2$, and $t_3 t_4$ of the speech signals. The manner in which the frequency of oscillator 98 is varied by this control voltage is indicated by the curve of Fig. 6 wherein the output frequency is plotted against frequency of the input speech signal. This new pitch control signal does not contain the higher frequency components which are present in the original transmitted control signal, at intervals 112 etc., and as a consequence, the fundamental frequency of the synthesized signal is a close copy of the true fundamental frequency of the original signal. The narrow band-width of filter 92 smooths the transmitted pitch signal's abrupt amplitude changes at times corresponding to the beginning and end of the voiced intervals. Because filter 92 is incapable of passing the unwanted higher frequency amplitude variations, its action might retard the transition from unvoiced to voiced intervals of the synthesized signal if the frequency of oscillator 98 was readjusted from zero value at the beginning of each voiced interval. This potential effect is avoided by maintaining the frequency of oscillator 98 at its minimum frequency value during the unvoiced interval by suitably proportioning the potential of source 96. At the beginning of each voiced interval it is only necessary to readjust the oscillator frequency to its desired value. The narrowed band-width of filter 92 is made sufficient to accommodate this change well within the allowable time interval.

As was previously explained, the noise, or "hiss" source 104 is connected to the receiving spectrum channel equipments through contact 106 of relay 102 during the unvoiced intervals of the signal wave. When a pitch signal is received from filter 100, relay 102 is operated to connect oscillator 98 to the spectrum channel equipment by way of relay contact 108. The energy derived from sources 98 and 104 is utilized in these spectrum channels in the manner which has been previously described in my Patent 2,183,248 and those previously identified as issued to H. W. Dudley.

Although this invention has been described in connection with a specific embodiment incorporated in a particular type of signal analyzing and synthesizing communication system, various modifications and changes of the described and illustrated circuit arrangements which do not depart from the spirit and scope of the invention will be apparent to those skilled in the art.

What is claimed is:

1. In a signal wave synthesizing system, a first source producing oscillatory energy having a component of a fundamental frequency and other components grouped in discrete frequency subbands, a second source producing oscillatory energy distributed throughout a continuous frequency spectrum, a frequency controlling branch connected to the first source to control the fundamental frequency of that source, a quantitative energy selection branch connected to both of said sources for controlling the quantitative selection of the energy outputs thereof, means connected to said two branches for impressing thereon a single fluctuating control voltage, and means for limiting the frequency of the fluctuations impressed on the frequency control branch to a value less than the permissible frequency fluctuations impressed on the other branch.

2. In a signal wave synthesizing system, a first source producing oscillatory output energy having a component of a fundamental frequency and other components grouped in harmonically distributed frequency subbands, a second source producing output energy distributed throughout a continuous frequency spectrum, a frequency controlling branch connected to the first source to control the fundamental frequency of that source, a discriminating branch connected to both of said sources for selecting the energy output of one of said sources to the exclusion of that of the other of said sources, means connected to said two branches for impressing thereon a single fluctuating control voltage, and means for limiting the frequency of the fluctuations impressed on the frequency control branch to a value less than the permissible frequency fluctuations impressed on the other branch.

3. In a signal wave synthesizing system, a first source producing oscillatory output energy having a component of a fundamental frequency and other components grouped in harmonic frequency subbands, a second source producing output energy distributed throughout a continuous spectrum, a frequency controlling branch connected to the first source to control the fundamental frequency of that source, a discriminating branch for selectively choosing between the output of said first and second sources, means connected to said two branches for impressing thereon a single fluctuating control voltage, and means for retarding the speed of response to said fluctuations of first source of oscillatory energy as compared to the speed of response to said fluctuations of said discriminating branch of said circuit.

4. In a signal wave synthesizing system, a first source producing oscillatory output energy having a component of a fundamental frequency and other components grouped in harmonic frequency subband relations, a second source producing output energy distributed throughout a continuous spectrum, a frequency controlling branch connected to the first source to control the fundamental frequency of that source, a discriminating selection branch for distinguishing between voiced and unvoiced types of signal waves and for controlling the selection of the energy outputs of said first and second sources in accordance with said discrimination, means connected to said two branches for impressing thereon a single fluctuating control voltage, and means for limiting the frequency of the fluctuations impressed on the frequency controlling branch to a value substantially less than the permissible frequency fluctuations impressed on the other branch.

5. In a signal wave synthesizing system, a first source producing oscillatory output energy having a component of a fundamental frequency and other components grouped into harmonically related frequency subbands, a second source producing output energy distributed throughout a continuous spectrum, a frequency controlling branch connected to the first source to control the fundamental frequency of that source, an energy selection branch connected to both of said sources for controlling the selection of the output of one source to the exclusion of the output of the other of said sources, means connected to said two branches for impressing thereon a single fluctuating control voltage, and frequency-sensitive means for limiting the frequency of the fluctuations impressed on the frequency control branch to a value substantially one-half that of the frequency fluctuations in said energy selection branch.

6. In a signal wave synthesizing system, a first source for the production of oscillatory energy having a fundamental frequency component and other components grouped in harmonic frequency subband relations, a second source producing output energy distributed throughout a continuous spectrum, a frequency controlling branch connected to the first source to control the fundamental frequency thereof, means for maintaining the frequency of said first source at a predetermined minimum value, an energy selection branch connected to both of said sources for selecting between the energy outputs thereof, means connected to said two branches for impressing thereon a single fluctuating control voltage for actuating said selecting branch and for controlling the frequency of oscillation of said first source above said predetermined minimum value in accordance with the magnitude of said fluctuating control voltage, and means for limiting the frequency of the fluctuations impressed on the frequency control branch to a value less than the permissible frequency fluctuations impressed on the energy selection branch.

7. A frequency counting and indicating mechanism, comprising a pair of multivibrator oscillators each of which has one normally non-conductive electron discharge device and one normally conductive electron discharge device, a cathode resistor in the anode-cathode circuit of each of said normally non-conductive devices, a direct connection from the cathode end of one resistor to the anode end of said other resistor, means for algebraically adding the voltage pulses generated across each of said resistors, and means for indicating the algebraic sum of said pulses.

8. A frequency counting and indicating arrangement, comprising a pair of multivibrator oscillators each of which has one stable and one unstable condition of equilibrium, means for generating a positive voltage pulse once during each cycle of operation of one of said oscillators and for generating a negative voltage pulse once during each cycle of operation of said other oscillator, said means comprising an equal cathode resistor in one anode-cathode circuit of each of said oscillators, means for algebraically adding said voltage pulses, means for indicating the sum of said addition, and means for simultaneously actuating each of said multivibrators.

9. A frequency counting and indicating device, comprising an input circuit, a pair of limiting amplifiers in parallel connection to said circuit, a series resistor-capacitor circuit termination of short time constant connected to the output of each of said amplifiers, a first and a second single-trip multivibrator oscillator, a cathode resistor in the cathode-anode circuit of the normally non-conductive tube of each of said oscillators, the upper end of said first oscillator resistor being connected to the lower end of said second oscillator resistor, the circuit elements of said first oscillator being of such value that the tubes of said oscillator conduct current for unequal periods during each operating cycle when operated at less than a predetermined frequency ($f_{min}$) and conduct current for equal periods during each operating cycle when operated at or in excess of said predetermined frequency, the circuit elements of said second oscillator being of such different value that each tube of said oscillator conducts current for unequal periods during each operating cycle when operated at less than a predetermined frequency ($f_{max}$) and conducts current for equal periods during each cycle when operated at or in excess of this same predetermined frequency, means for algebraically adding the voltage pulses produced by intermittent current flow in each of said cathode resistors, and means for indicating the algebraic sum of the added voltage pulses.

10. A frequency counting and indicating device, comprising a first and second periodic device, each of said devices comprising a normally conducting and a normally non-conducting vacuum tube, means comprising a pair of impedance paths for coupling the anode of each of said normally non-conductive tubes to the control electrode of its respective conducting tube in such manner that when the normally non-conducting tube of said first device is made conductive, its respective normally conducting tube is made non-conductive for a natural period that is equal to one-half the period corresponding to a first predetermined frequency value, and when the normally non-conducting tube of said second device is made conductive, its respective normally conducting tube is made non-conductive for a natural period that is equal to one-half the period corresponding to a second and higher predetermined frequency value, equal valued cathode resistors in the anode-cathode path of the normally non-conducting tube of each of said devices, means for equating the potential at the upper end of one cathode resistor to that at the lower end of said other cathode resistor, means comprising an attenuating network for equating the energy content of the pulses produced across said cathode resistors, means for algebraically adding said equalized pulses, and means for measuring and indicating the algebraic sum of said added pulses.

11. A frequency counting and indicating circuit, comprising a first and a second multivibrator circuit, each of said circuits comprising a first and a second electron discharge device, each of which comprises an anode, a cathode and a control grid electrode, a first source of positive potential, individual resistance connections between the positive terminal of said first source and the anodes of said first multivibrator, a cathode resistor connected at its upper end to the cathode of the first device of said first multivibrator and at its lower end to the negative terminal of said first source, a connection between the cathode of the second device of said first multivibrator and the negative terminal of said first source, a series capacitor-resistor circuit shunted between the anode of the first device and the cathode of the second device of said first multivibrator, the control electrode of the second device of said first multivibrator being connected to the juncture of said resistor and capacitor, a pair of series resistors connected between the anode and cathode of the second device of said first multivibrator, a source of grid bias potential positively connected to the juncture of said series resistors, the control electrode of the first device of said first multivibrator being connected to the negative terminal of said grid potential source, said second multivibrator comprising a second source of positive potential, individual resistances connected between the positive terminal of said second source and the anodes of said second multivibrator, a cathode resistor connected at its upper end to the cathode of the first device of said second multivibrator and at its lower end to the negative terminal of said second source of potential, the negative terminal of said second source being connected to the cathode of the second device of said second multivibrator, a series capacitor-resistor circuit shunted between the anode of the first device and the cathode of the second device of said second multivibrator, the control electrode of the second device of the second multivibrator being connected to the juncture of said second-mentioned series capacitor-resistor circuit, a pair of series resistors connected between the anode and cathode of the second device of said second multivibrator, a source of grid bias potential positively connected to the juncture of said second-mentioned series resistors, the control electrode of the first device of said second multivibrator being connected to the negative terminal of said last-mentioned grid potential source, means interconnecting the cathode end of said first-mentioned cathode resistor and the anode end of said second-mentioned cathode resistor, means comprising a resistance hybrid circuit for algebraically adding the voltage pulses generated across said first- and second-mentioned cathode resistors, and means for indicating the algebraic sum of said added voltage pulses.

ROBERT R. RIESZ.

REFERENCES CITED

The following references are of record in the file of this patent:

UNITED STATES PATENTS

| Number | Name | Date |
|---|---|---|
| 2,151,091 | Dudley | Mar. 21, 1939 |
| 2,183,248 | Riesz | Dec. 12, 1939 |
| 2,243,526 | Dudley | May 27, 1941 |
| 2,243,527 | Dudley | May 27, 1941 |